United States Patent Office 3,849,389
Patented Nov. 19, 1974

3,849,389
INTERMEDIATES TO THE 5-Phe ANALOG OF LH-RH
James E. Shields, Indianapolis, Ind., assignor to Eli Lilly and Company, Indianapolis, Ind.
No Drawing. Filed Oct. 19, 1972, Ser. No. 298,893
Int. Cl. A61k 27/00; C07c 103/52
U.S. Cl. 260—112.5     3 Claims

ABSTRACT OF THE DISCLOSURE

An analog of LH-RH having the formula

PyroGlu-His-Trp-Ser-Phe-Gly-Leu-Arg-Pro-Gly-NH$_2$ as well as its pharmaceutically acceptable acid addition salts exhibit luteinizing hormone release activity and are useful in stimulating fertility in humans and synchronizing estrous in farm animals.

BACKGROUND AND SUMMARY OF THE INVENTION

The release of luteinizing hormone (LH) from the anterior pituitary gland is regulated by the hypothalamus by means of a substance designated alternatively as luteinizing hormone releasing hormone (LH-RH) or releasing factor (LH-RF). For purposes of clarity and consistency, the term "LH-RH" will be employed from this point forward and throughout when referring to this substance. Recently [H. Matsuo, Y. Baba, R. M. G. Nair, A. Arimura, and A. V. Schally, *Biochem. Biophys. Res. Commun.*, 43, 1334 (1971)], it has been established that LH-RH has the following structure:

PyroGlu-His-Trp-Ser-Tyr-Gly-Leu-Arg-Pro-Gly-NH$_2$
  1    2    3    4    5    6   7    8    9   10

CBz-L-Phe + Gly(Et)·HCl
   │ NMM
   │ IBCF
   ↓
CBz-L-Phe-Gly(Et)   (I)
   │ HCl
   │ H$_2$, Pd/C
   ↓
L-Phe-Gly(Et)·HCl
   │ NMM
   │ IBCF
   ↓ CBz-L-Ser(*t*-Bu)·DCHA
CBz-L-Ser(*t*-Bu)-L-Phe-Gly(Et)   (II)
   │ NaOH
   ↓
CBz-L-Ser(*t*-Bu)-L-Phe-Gly   (III)
   │ H$_2$, Pd/C
   ↓
L-Ser(*t*-Bu)-L-Phe-Gly
   │ CBz-L-Trp(NHS)
   ↓
CBz-L-Trp-L-Ser(*t*-Bu)-L-Phe-Gly   (IV)
   │ H$_2$, Pd/C
   ↓
L-Trp-L-Ser(*t*-Bu)-L-Phe-Gly
   │ TEA
   │ (AdOC)$_2$-L-His(NHS)
   ↓
(AdOC)$_2$-L-His-L-Trp-L-Ser(*t*-Bu)-L-Phe-Gyl   (VI)

A new decapeptide amide has been discovered which exhibits luteinizing hormone release activity and it is to this compound as well as its pharmaceutically acceptable acid addition salts that this invention is directed.

Thus, this invention is directed to a compound of the formula

L-PyroGlu-L-His-L-Trp-L-Ser-L-Phe-
                              Gly-L-Leu-L-Arg-L-Pro-Gly-NH$_2$ and its pharmaceutically acceptable acid addition salts.

This invention is also directed to novel compounds useful as intermediates in the preparation of the LH-RH analogs of this invention, and includes:

A compound of the formula

R$_1$-L-Phe-Gly(R)

in which R is hydrogen, methyl, ethyl, *p*-nitrobenzyl, or benzyl; and R$_1$ is H-; R$_3$-; R$_3$-L-Ser(R$_2$)-; or L-Ser(R$_2$)-; in which R$_2$ is *t*-butyl or benzyl and R$_3$ is CBz-, BOC-, AOC- or AdOC-; or an acid addition salt of those compounds in which R$_1$ is H- or L-Ser(R$_2$)-; and A compound of the formula R$_4$-L-Trp-L-Ser(R$_2$)-L-Phe-Gly(R)

in which R is hydrogen, methyl, ethyl, *p*-nitrobenzyl, or benzyl; R$_2$ is *t*-butyl or benzyl; and, when R$_2$ is *t*-butyl, R$_4$ is H-, CBz-, or (AdOC)$_2$-L-His-; and, when R$_2$ is benzyl, R$_4$ is H-, CBz-, BOC-, AOC-, AdOC-, or (AdOC)$_2$-L-His-.

DETAILED DESCRIPTION OF THE INVENTION

The LH-RH analogs of this invention can be prepared by a systematic building of the particular peptide sequence. One method which is available can be illustrated by the following scheme:

CBz-L-Pro + Gly-NH$_2$
   │ IBCF
   ↓
CBz-L-Pro-Gly-NH$_2$   (VII)
   │ TSA
   │ H$_2$, Pd/C
   ↓
L-Pro-Gly-NH$_2$·TSA   (VIII)
   │ DCHA
   │ HOBT, DCC
   ↓ CBz-L-Arg(NO$_2$)
CBz-L-Arg(NO$_2$)-L-Pro-Gly-NH$_2$   (IX)
   │ HBr,
   │ TFA
   ↓
L-Arg(NO$_2$)-L-Pro-Gly-NH$_2$·HBr   (X)
   │ DCHA
   │ *tert*-BOC-L-Leu(PNP)
   ↓
*tert*-BOC-L-Leu-L-Arg(NO$_2$)-L-Pro-Gly-NH$_2$   (XI)
   │ HCl, TFA
   ↓
L-Leu-L-Arg(NO$_2$)-L-Pro-Gly-NH$_2$·HCl   (XII)

(AdOC)$_2$-L-His-L-Trp-L-Ser(*t*-Bu)-L-Phe-Gly (VI) + L-Leu-L-Arg(NO$_2$)-L-Pro-Gly-NH$_2$·HCl (XII)
                                         │ NMN
                                         │ HOBT
                                         ↓ DCC (AdOC)$_2$-L-His-L-Trp-L-Ser(*t*-Bu)-L-Phe-Gly-L-Leu-L-Arg(NO$_2$)-L-Pro-Gly-NH$_2$   (XIII)
                                         │ TFA
                                         ↓

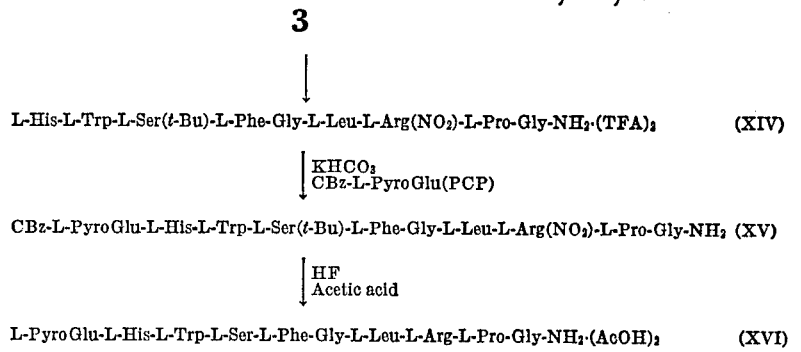
An alternate method of preparing the analogs of this invention can be illustrated by the following scheme:
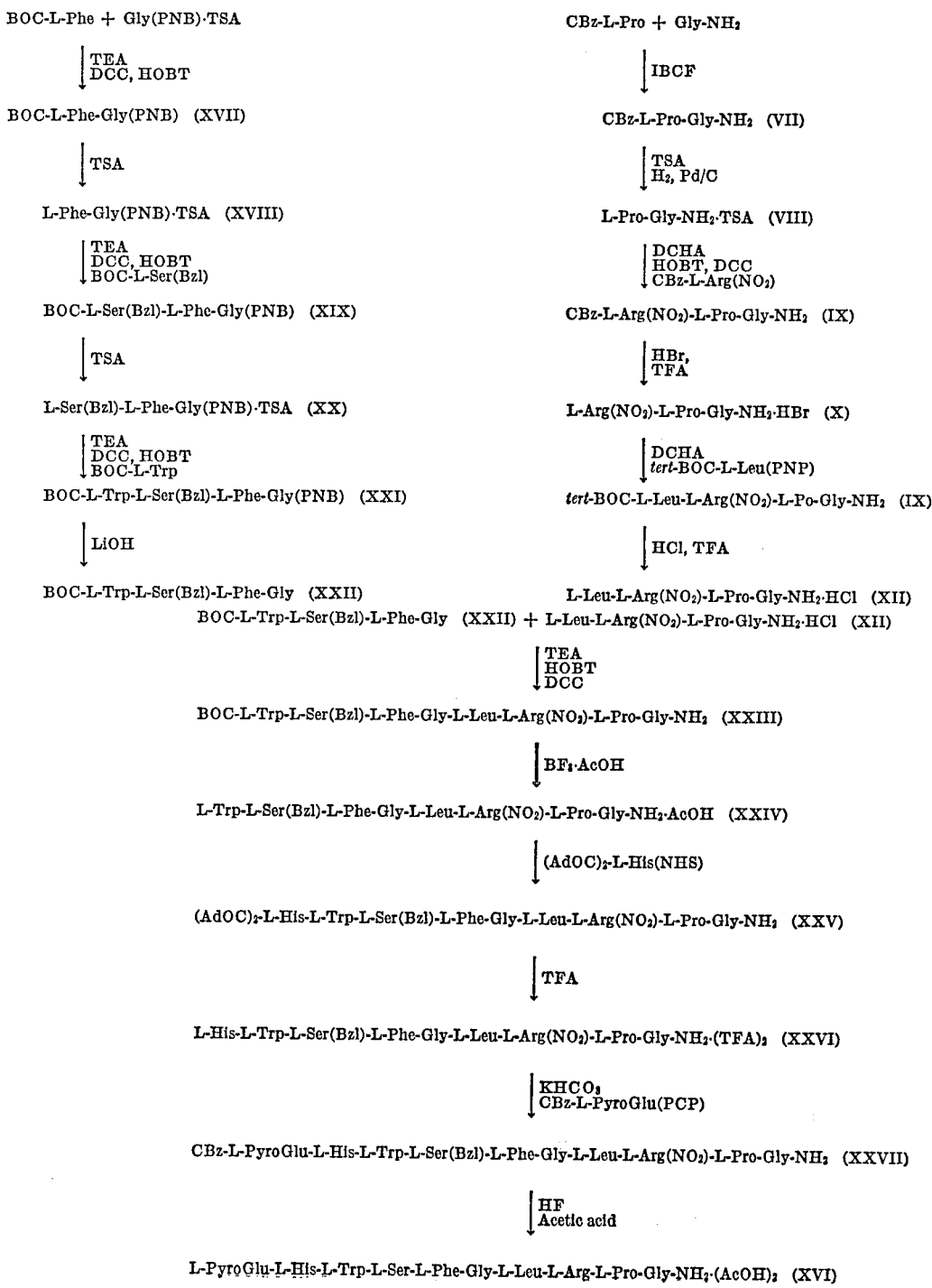

The man skilled in the art will well recognize that various modifications to the above delineated scheme can be made without departing from the spirit of the teaching. Such modifications include, for example, the interchangeability of recognized protecting groups as well as the use of particular methods of peptide coupling and deblocking.

In the specification and claims, the following abbreviations, most of which are well known and commonly used in the art, are employed:

| | |
|---|---|
| Arg | Arginine. |
| Gly | Glycine. |
| His | Histidine. |
| Leu | Leucine. |
| Phe | Phenylalanine. |
| Pro | Proline. |
| PyroGlu | Pyroglutamic acid. |
| Ser | Serine. |
| Trp | Tryptophan. |
| CBz | Benzyloxycarbonyl. |
| AOC | *Tert*-amyloxycarbonyl. |
| BOC | *Tert*-butyloxycarbonyl. |
| *t*-Bu | *Tert*-butyl. |
| Bzl | Benzyl. |
| Et | Ethyl. |
| Me | Methyl. |
| TSA | *p*-Toluenesulfonic acid. |
| TFA | Trifluoroacetic acid. |
| AdOC | Adamantyloxycarbonyl. |
| NHS | N-hydroxysuccinimido. |
| HOBT | 1-hydroxybenzotriazole. |
| DCC | N,N'-dicyclohexylcarbodiimide. |
| IBCF | Isobutyl chloroformate. |
| DCHA | Dicyclohexylamine. |
| TEA | Triethylamine. |
| PNP | *p*-Nitrophenyl. |
| PNB | *p*-Nitrobenzyl. |
| PCP | Pentachlorophenyl. |
| NMM | N-methylmorpholine. |
| AcOH | Acetic acid. |

The synthesis of the LH-RH analogs involves coupling of amino acids or peptide fragments by reaction of the carboxyl function of one with the amino function of another to produce an amide linkage. In order to realize the coupling, it is essential, first, that all reactive functionalities not participating directly in the reaction be inactivated by appropriate blocking groups, and, secondly, that the carboxyl function which is to be coupled be appropriately activated to permit coupling to proceed. All of this involves a careful selection of both reaction sequence and reaction conditions as well as utilization of specific blocking groups so that the desired ultimate peptide will be realized. Each of the amino acids employed to produce the analogs of this invention and having the particularly selected protecting groups and/or activating functionalities is prepared by employing techniques well recognized in the peptide art.

Specific blocking groups are employed at each point in the total synthesis of the LH-RH analogs of this invention. These particular blocking groups have been found to function most smoothly although other groups would indeed operate satisfactorily in the total synthesis although perhaps with lesser efficiency. Thus, for example, benzyloxycarbonyl, *t*-butyloxycarbonyl, *t*-amyloxycarbonyl, *p*-methoxybenzyloxycarbonyl, and adamantyloxycarbonyl can be variously employed as N-blocking groups at selected points in the synthesis. Furthermore, *tert*-butyl is employed as the hydroxy-protecting group even though others, such as a benzyl group, could well be employed.

In rendering the carboxyl function active to the coupling reaction, at least two separate well recognized techniques are employed at various points in the total synthesis approach in preparing the analogs of this invention. One such activation technique which is employed at particular points in the synthesis involves the conversion of the carboxyl function to a mixed anhydride. The free carboxyl function is activated by reaction with another acid, typically a derivative of carbonic acid, such as an acid chloride thereof. Examples of acid chlorides used to form mixed anhydrides are ethyl chloroformate, phenyl chloroformate, *sec*-butyl chloroformate, isobutyl chloroformate, pivaloyl chloroformate, and the like.

Another method of activating the carboxyl function for the coupling reaction is by conversion to its active ester derivative. Such active esters include, for example, a 2,4,5-trichlorophenyl ester, a pentachlorophenyl ester, a *p*-nitrophenyl ester, an ester formed from 1-hydroxybenzotriazole, and an ester formed from N-hydroxysuccinimide.

The carboxyl blocking groups used in preparing the analogs of this invention can be any of the typical ester-forming groups, including, for example, $C_1$–$C_4$ alkyl, such as methyl, ethyl, and *tert*-butyl, benzyl, *p*-nitrobenzyl, *p*-methoxybenzyl, 2,2,2-trichloroethyl, and the like. These can be readily removed by alkaline saponification. Relatively strong alkaline conditions, typically an alkaline metal hydroxide, such as sodium hydroxide, potassium hydroxide, lithium hydroxide, and the like, are generally employed to deesterify the protected carboxyl under reaction conditions well recognized in the art. Highly preferred for use is lithium hydroxide. In those instances in which the carboxyl blocking group is *p*-nitrobenzyl, deblocking can be accomplished by reduction in the presence of zinc and hydrochloric acid.

The nitrogen blocking groups are cleaved in the presence of acid such as HBr, HCl, trifluoroacetic acid, *p*-toluenesulfonic acid, benzenesulfonic acid, naphthylene sulfonic acid acetic acid, and the like, to form the respective acid addition salt products. The cleavage can also be accomplished by hydrogenation in the presence of a catalyst such as palladium on carbon. Since this latter method may result in cleavage of more than merely the intended N-blocking group, its use remains rather limited. Another method which is available for accomplishing cleavage of the nitrogen blocking group involves the use of boron trifluoride. For example, boron trifluoride diethyl etherate in glacial acetic acid will convert the nitrogen-protected peptide to a $BF_3$ complex which then can be converted to the deblocked peptide by treatment with base, such as aqueous potassium bicarbonate.

Cleavage of the blocking groups present on the final intermediate to obtain the LH-RH analog can be accomplished by hydrogenation in the presence of a catalyst, typically palladium on carbon, and an acid suitable for formation of a pharmaceutically acceptable salt. Such acids include, for example, inorganic acids, such as HCl, HBr, and the like, organic acids, such as carboxylic acids, including propionic acid, and the like, sulfonic acids, including *p*-toluene-sulfonic acid, benzenesulfonic acid, naphthalenesulfonic acid, and the like. Cleavage can also be accomplished by treating the intermediate with liquid HF in the presence of anisole and a sulfide, such as methyl ethyl sulfide, evaporating the excess HF, dissolving the product in a solution of the selected pharmaceutically acceptable acid, and lyophilizing to produce the pharmaceutically acceptable acid addition salt of the LH-RH analog. The LH-RH analog can be isolated in the form of its free base, although it is preferred that it be isolated as a pharmaceutically acceptable acid addition salt.

The particular methods of coupling, blocking, or cleavage employed in preparing the analogs of this invvention are each now well recognized in the art. The conditions under which a particular coupling, blocking, or cleavage reaction would be carried out will be apparent to those skilled in the art.

Illustrative of the compounds which are a part of this invention and which are useful as intermediates in the preparation of the analogs of this invention are the following:

H-L-Phe-Gly(Me)·HBr;
H-L-Phe-Gly(Bzl)·AcOH;
CBz-L-Ser(t-Bu)-L-PheGly(PNB);
AOC-L-Ser(Bzl)-L-Phe-Gly(Et);
H-L-Ser(t-Bu)-L-Phe-Gly(Et)·TSA;
H-L-Ser(Bzl-L-Phe-Gly(Bzl)·HCl;
AdOC-L-Ser(Bzl)-L-Phe-Gly;
CBz-L-Ser(Bzl)-L-Phe-Gly;
H-L-Ser(t-Bu)-L-Phe-Gly;
H-L-Ser(Bzl)-L-Phe-Gly;
CBz-L-Trp-L-Ser(t-Bu)-L-Phe-Gly;
BOC-L-Trp-L-Ser(Bzl)-L-Phe-Gly;
AOC-L-Trp-L-Ser(Bzl)-L-Phe-Gly(Et);
AdOC-L-Trp-L-Ser(Bzl)-L-Phe-Gly(PNB);
CBz-L-Trp-L-Ser(Bzl)-L-PhPe-Gly;
CBz-L-Trp-L-Ser(t-Bu)-L-Phe-Gly;
H-L-Trp-L-Ser(t-Bu)-L-Phe-Gly;
H-L-Trp-L-Ser(Bzl)-L-Phe-Gly;
(AdOC)$_2$-L-His-L-Trp-L-Ser(t-Bu)-L-Phe-Gly;
(AdOC)$_2$-L-His-L-Trp-L-Ser(Bzl)-L-Phe-Gly;

and the like.

The activity of the LH-RH analog of this invention is determined by placing hemisected anterior pituitaries, removed from mature diestrous female rats, into 20 ml. flasks each containing 3 ml. of commercially available Medium 199. Two pituitary halves are placed into each of two flasks, and the two flasks comprise a paired-flask unit. One flask serves as the control, and the analog is added to the other flask. Before addition of any analog the pituitaries are preincubated in 3 ml. of Medium 199 for 1 hour at 37° C. in a Dubnoff metabolic shaker. At the end of one hour the preincubation medium is discarded, fresh medium is added to the control flask, and fresh medium with analog is added to the experimental flask. All volumes are 3.0 ml. The flask pairs are incubate for an additional 2 hours, whereupon the medium in each is collected and assayed for LH by radioimmunoassay. Fresh medium and analog are added as before and the flasks are incubated for an additional 0.5 hr. The medium in each flask is then again collected and assayed for LH.

Due to this LH release activity, the analogs of this invention can be used to stimulate fertility in humans and additionally can be employed in the synchronization of estrous in farm animals. Administration of the LH-RH analogs can be orally or parenterally. In oral administration a timed release is preferred to assure that the analog reaches the intestine intact. Administration can also be by any of the other usual routes, including, for example, intraperitoneal, intramuscular, subcutaneous, and sublingual.

Generally, the analog will be administered to a female subject in a single dose or multiple cumulative doses in an amount sufficient to achieve release of LH which in turn will induce ovulation at an appropriate predetermined time.

The dose level is such as is sufficient to achieve release of LH at the level desired and generally will be from about 0.01 to about 100 micrograms.

The following examples are provided for the purpose of illustrating the preparation and activity of the analogs of this invention and are not intended to be limiting upon the scope thereof.

EXAMPLE 1

Benzyloxycarbonyl-L-phenylalanyl-glycine, ethyl ester (I)

A solution of 13.96 g. (100 mmoles) of glycine ethyl ester hydrochloride in 250 ml. of N,N-dimethylformamide was cooled in an ice-ethanol bath. To the mixture were added 11 ml. (100 mmoles) of N-methylmorpholine, and the mixture was stirred in the cooling bath.

A solution of 35.916 g (120 mmoles) of benzyloxycarbonyl-L-phenylalanine in 200 ml. of N,N-dimethylformamide was cooled in an ice-ethanol bath. To the solution were added 13.2 ml. (120 mmoles) of N-methylmorpholine and 15.6 ml. (120 mmoles) of isobutyl chloroformate. The mixture was stirred for 15 minutes in the cooling bath and then added to the cold mixture of the neutralized glycine ethyl ester hydrochloride. The total mixture was maintained at −16° C. for 19.5 hours. The mixture was then brought to 0° C. with continued stirring, treated with 50 ml. of 1N sodium bicarbonate solution, and stirred at 0° C. for 1 hour during which time solution occurred. The solution was slowly poured into 3 liters of cold 90% saturated sodium chloride solution with vigorous stirring. The product mixture was maintained at 5° C., and the product was collected by filtration and washed with water. The product was dried in vacuo over phosphorus pentoxide; yield, 39 g. (100%), m.p. 98–100° C.

Analysis.—Calcd. for $C_{21}H_{24}N_2O_5$: C, 65.61; H, 6.29; N, 7.29; O, 20.81. Found: C, 65.35; H, 6.12; N, 7.34; O, 20.75.

Amino acid analysis: $Phe_{1.0}Gly_{1.0}$.

TLC:
System A ($R_f$ of I) _____ 0.803
System B _____ 0.781

System A: Chloroform/methanol/acetic acid (75:24:1).
System B: n-Butanol/acetic acid/water/pyridine (30:6:24:20).

EXAMPLE 2

Benzyloxycarbonyl-O-t-butyl-L-seryl-L-phenylalanyl-glycine, ethyl ester (II)

To a solution of 38.5 g. (100 mmoles) of I in 600 ml. of MeOH were added 10 g. of 5% palladium on carbon (Pd/C) which had been moistened with acetic acid and 93 ml. of 1.077N methanolic hydrochloric acid. The mixture was hydrogenated for 6¾ hours. A thin layer chromatogram run in chloroform/methanol/acetic acid (75:24:1) indicated deblocked dipeptide with no starting material present. $R_f$ of the deblocked dipeptide hydrochloride was 0.631, whereas $R_f$ of I was 0.805.

The mixture was filtered, and the filtrate was concentrated in vacuo to a foam. The foam was dissolved in 100 ml. of N,N-dimethylformamide and cooled in an ice-ethanol bath. The solution was stirred with cooling and was treated with 11 ml. (100 mmoles) of N-methylmorpholine.

A suspension of 55.31 g. (120 mmoles) of benzyloxycarbonyl-O-t-butyl-L-serine dicyclohexylamine salt in 600 ml. of ethyl acetate was shaken twice with 125 ml. of 10% citric acid solution. The ethyl acetate phase was then washed three times with 100 ml. each of 10% sodium chloride solution, and twice with 100 ml. of water. The ethyl acetate was dried over sodium sulfate. The mixture was filtered, and the filtrate was concentrated in vacuo. The residual oil was dissolved in 160 ml. of N,N-dimethylformamide and cooled in an ice-ethanol bath. The solution was treated with 13.2 ml. (120 mmoles) of N-methylmorpholine and 15.6 ml. (120 mmoles) of isobutyl chloroformate and stirred for 15 minutes. The resulting mixture was added to the cold N,N-dimethylformamide solution of L-phenylalanyl-glycine, ethyl ester. The mixture was stirred at −16° C. for 66¾ hours.

The reaction mixture then was warmed to 0° C. with continued stirring. The mixtue was treated with 50 ml. of 1N sodium bicarbonate solution and stirred at 0° C. for 1 hour. The mixture was then added slowly with stirring to 3 liters of cold 90% saturated sodium chloride solution. An oily solid resulted. Storage of the solid at 5° C. for several hours solidified the product which was collected by filtration and washed successively with water, 10% citric acid solution, water, 1N sodium bicarbonate solution, and water. The product was dried in vacuo over potassium hydroxide; yield, 47.84 g. (91%), m.p. 106.5–108.5° C., $[\alpha]_D^{25}$= −20.1 (c.=1.09, TFE).

*Analysis.*—Calcd. for $C_{28}H_{37}N_3O_7$: C, 63.74; H, 7.07; N, 7.96; O, 21.23. Found: C, 63.79; H, 7.06; N, 8.10; O, 21.32.

Amino acid analysis: $Ser_{0.91}Phe_{0.95}Gly_{1.0}$.

TLC:

| | |
|---|---|
| System A ($R_f$ of II) | 0.824 |
| System B | 0.790 |

System A: Chloroform/methanol/acetic acid (75:24:1).
System B: n-Butanol/acetic acid/water/pyridine (30:6:24:20).

EXAMPLE 3

Benzyloxycarbonyl-O-*t*-butyl-L-seryl-L-phenylalanyl-glycine (III)

A suspension of 26.38 g. (50 mmoles) of II in 400 ml. each of dioxane and water was treated with 52.5 ml. (52.5 mmoles) of 1N sodium hydroxide. The mixture was stirred at room temperature for 17.5 hours after which solution occurred. The solution was then treated with 2.5 ml. of 1N hydrochloric acid and stirred. The pH of the solution was 6.6. The solution was acidified to pH 3.5 with 10% citric acid. About 200 ml. of water were added dropwise to precipitate the product. The product was collected, washed with water, and dried *in vacuo* over phosphorus pentoxide; yield, 19.3 g. (78%), m.p. 146–147° C., $[\alpha]_D^{25}=-21.4°$ ($c.=2.04$, TFE).

*Analysis.*—Calcd. for $C_{26}H_{33}N_3O_7$: C, 62.51; H, 6.66; N, 8.41; O, 22.42. Found: C, 62.71; H, 6.61; N, 8.49; O, 22.28.

Amino acid analysis: $Ser_{0.88}Phe_{0.96}Gly_{1.0}$.

$R_f$ of II and III in chloroform/methanol/acetic acid (75:24:1) are 0.868 and 0.585, respectively.

EXAMPLE 4

Benzyloxycarbonyl-L-tryptophyl-O-*t*-butyl-L-seryl-L-phenylalanyl-glycine (IV)

To a solution of 7.5 g. (15 mmoles) of III in 75 ml. of methanol were added 1.5 g. of 5% Pd/C which had been moistened with acetic acid. Hydrogen was bubbled through this mixture for 3¾ hours after which time carbon dioxide evolution had ceased (as determined by a barium hydroxide trap). Each of two thin layer systems indicated the tripeptide III had been deblocked:

| System | A | B |
|---|---|---|
| $R_f$ of III | 0.639 | 0.684 |
| $R_f$ of deblocked tripeptide | 0.191 | 0.224 |

System A: Chloroform/methanol/acetic acid (75:24:1).

System B: Tetrahydrofuran/cyclohexane/water (93:7:10).

The product had become partially insoluble in methanol. A small amount of N,N-dimethylformamide was added, and the mixture was heated on a steam bath until the product dissolved. The mixture was then filtered. The filtrate was concentrated *in vacuo*. The resulting solid was dissolved in 175 ml. of N,N-dimethylformamide, and the solution was cooled to 0° C. To the cold solution were added 7.184 g. (16.5 mmoles) of benzyloxycarbonyl-L-tryptophane N-hydroxysuccinimide ester in 25 ml. of N,N-dimethylformamide. The reaction mixture was stirred at 4° C. for 48 hours during which time solution occurred. The mixture was then stirred at room temperature for 65 hours.

The solution was concentrated *in vacuo* to an oil. Attempted crystallization failed. The oil was dried *in vacuo*. A 100 megacycle nuclear magnetic resonance spectrum of the oil (in DMSO $d_6$) indicated product IV with some N,N-dimethylformamide and ethyl acetate (from the crystallization attempts). Two thin layer systems indicated one spot material:

| | |
|---|---|
| System A ($R_f$ of IV) | 0.503 |
| System B | 0.700 |

System A: Chloroform/methanol/acetic acid (75:24:1).

Syhtem B: n-Butanol/acetic acid//water/pyridine (30:6:24:20).

*Analysis.*—Calcd. for $C_{37}H_{43}N_5O_8$: C, 64.80; H, 6.32; N, 10.21; O, 18.66. Found: C, 53.96; H, 6.63; N, 10.59; O, 24.92.

Amino acid analysis: $Trp_{1.02}Ser_{0.92}Phe_{0.98}Gly_{1.0}$.

EXAMPLE 5

L-tryptophyl-O-*t*-butyl-L-seryl-L-phenylalanylglycine (IV)

The oil IV was dissolved in 45 ml. each of acetic acid and N,N-dimethylformamide. To this solution was added 1.5 g. of 5% Pd/C which had been moistened with acetic acid. The mixture was hydrogenated for 4 hours. A barium hydroxide trap indicated that evolution of carbon dioxide had ceased. The mixture was filtered, and the filtrate was concentrated *in vacuo*. The residual oil was triturated with ether to produce a solid which was collected and washed with ether. The solid was dried *in vacuo*. A thin layer chromatogram run in tetrahydrofuran/cyclohexane/water (93:7:10) indicated tryptophane contamination.

The product was recrystallized from water. The recrystallized product was dried *in vacuo* over sodium hydroxide; yield, 4.51 g. (55%, based on III), m.p. 155.5°–159° C., $[\alpha]_D^{25}=-21.6°$ ($c.=0.4$, TFE).

*Analysis.*—Calcd. for $C_{29}H_{37}N_5O_6$: C, 63.14; H, 6.76; N, 12.70; O, 17.40. Found: C, 63.08; H, 6.68; N, 12.49; O, 17.23.

Amino acid analysis: $Trp_{1.15}Ser_{0.80}Phe_{1.03}Gly_{1.0}$.

TLC:

| System | A | B |
|---|---|---|
| $R_f$ of IV | 0.628 | 0.770 |
| $R_f$ of V | 0.168 | 0.318 |

System A: Chloroform/methanol/acetic acid (75:24:1).

System B: Tetrahydrofuran/cyclohexane/water (93:7:10).

EXAMPLE 6

$N^\alpha,N^{IM}$-diadamantyloxycarbonyl-L-histidyl-L-tryptophyl-O-*t*-butyl-L-seryl-L-phenylalanyl-glycine (VI)

A suspension of 3.862 g. (7 mmoles of V in 25 ml. of N,N-dimethylformamide was treated with 0.973 ml. (7 mmoles) of triethylamine to effect solution. To the solution were added 4.87 g. (8 mmoles) of $N^\alpha,N^{IM}$-diadamantyloxycarbonyl-histidine N-hydroxysuccinimide ester in 15 ml. of N,N-dimethylformamide. The mixture was stirred at room temperature for 71 hours. A solution resulted with development of a brown color. About 175 ml. of water were added with scratching and stirring but with no precipitation of product. The solution was concentrated *in vacuo*, the resulting oil was dissolved in N,N-dimethylformamide, and the solution was filtered. Precipitation was effected by addition of ether. The mixture was maintained at 5° C., filtered, and the product was washed with ether.

Thin layer chromatography indicated contamination by the presence of the N-hydroxysuccinimide ester. The product was recrystallized from ethanol and water and dried *in vacuo* over sodium hydroxide; yield, 2.088 g. (29%), m.p. 160–162° C. (dec.), $[\alpha]_D^{25}=+0.3°$ ($c.=0.49$, TFE).

*Analysis.*—Calcd. for $C_{57}H_{72}N_8O_{11}$: C, 65.50; H, 6.94; N, 10.72; O, 16.84. Found: C, 64.50; H, 6.60; N, 10.68; O, 17.01.

[100 megacycle nuclear magnetic resonance spectrum indicated the presence of N,N-dimethylformamide which would account for the incongruities of this elemental analysis.]

Amino acid analysis: $His_{0.88}Trp_{0.93}Ser_{0.88}Phe_{1.05}Gly_{1.0}$.

EXAMPLE 7

Benzyloxycarbonyl-L-prolyl-glycinamide (VII)

Benzyloxycarbonyl-L-proline (97.75 g., 0.391 mole) was dissolved in 200 ml. of DMF, cooled to −15° C., and 50.3 ml. (0.387 mole) of isobutyl chloroformate and 42.5 ml. (0.387 mole) of N-methylmorpholine were added. After 5 minutes, a suspension of glycinamide [made by suspending 43.1 g. (0.391 mole) of glycinamide hydrochloride in 200 ml. of DMF, cooling to −15° C., and adding 43 ml. (0.391 mole) of N-methylmorpholine] was added. The reaction mixture was stirred 2-3 hours at −15° C., and then allowed to warm to room temperature overnight with stirring. The reaction mixture was filtered, and the filtrate was evaporated *in vacuo*. The residue was azeotroped with toluene, dissolved in 400 ml. of hot water, treated with activated carbon and filtered. After cooling to room temperature, crystallization occurred. After cooling overnight at 4° C., the product was filtered. A second recrystallization from hot water gave 64.95 g. (55%), m.p. 137–142° C.

Elemental analysis.—Calcd. for $C_{15}H_{20}N_3O_4$: C, 58.81; H, 6.58; N, 13.72; O, 20.89. Found: C, 58.94; H, 6.30; N, 13.71; O, 20.91.

EXAMPLE 8

$N^\alpha$-Benzyloxycarbonyl-G-nitro-L-arginyl-L-propyl-glycinamide (IX)

A solution of 31.2 g. (0.102 mole) of benzyloxycarbonyl-L-prolyl-glycinamide and 19.38 g. (0.102 mole) of p-toluenesulfonic acid monohydrate in 100 ml. of DMF/MeOH (1:1) was hydrogenated for 12 hours in the presence of 4.0 g. of 5% palladium on carbon. The catalyst was removed by filtration, the filtrate evaporated *in vacuo* to dryness, and the residue azeotroped four times with benzene. The residue was dissolved in 300 ml. of DMF, cooled to 0° C., and 20.1 ml. (0.102 mole) of N,N-dicyclohexylamine, 13.77 g. (0.102 mole) of N-hydroxybenzotriazole, and 23.1 g. (0.112 mole) of N,N'-dicyclohexylcarbodiimide were added. After the solution was stirred for 10 minutes at 0° C., 44.3 g. (0.1255 mole) of $N^\alpha$-benzyloxycarbonyl-G-nitroarginine was added, and the reaction mixture was stirred mechanically for 18 hours, gradually warming to room temperature during that period. The precipitated solids were removed from the reaction mixture by filtration, and the filtrate was diluted with water to the cloud point. Ethanol was added to clear the solution. The solution was treated with sufficient Amberlite MB-1 ion exchange resin (in 100 ml. portions of resin in 20% aqueous ethanol) to remove 1-hydroxybenzotriazole and other ionic species. The resin batches were washed thoroughly with 20% aqueous ethanol, the washings were combined with the filtrate, and the filtrate was evaporated to dryness *in vacuo*. The residue was dissolved in hot tetrahydrofuran with addition of a minimum volume of methanol to ensure solution. Precipitation with ethyl acetate and filtration after standing in the cold gave 39.89 g. of solid which was chromatographically impure. The solid was triturated with hot water, and the suspension was placed in the cold overnight. The aqueous layer was decanted, and the residue was dissolved in methanol. Evaporation of the solvent *in vacuo*, and the resolution of the residue in hot tetrahydrofuran, followed by reprecipitation with ethyl acetate gave an amorphous solid; yield 35.6 g. (69%).

Analysis.—Calcd for $C_{13}H_{26}N_8O_5Br$: C, 49.70; H, 6.16; N, 22.08; O, 22.07. Found: C, 49.73; H, 5.99; N, 22.12; O, 22.24.

Amino acid analysis: $Arg_{0.99}Pro_{1.00}Gly_{1.01}$.

EXAMPLE 9

G-nitro-L-arginyl-L-prolyl-glycinamide hydrobromide (X)

Dry hydrogen bromide was bubbled into a solution of 32.6 g. (0.064 mole) of IX in 200 ml. of a mixture of trifluoroacetic acid and anisole (7:1). After 45 minutes, the reaction mixture was diluted to one liter with ether, cooled, triturated, and filtered. The precipitated residue was dried *in vacuo* over KOH pellets. The slightly yellow solid was suspended in 200 ml. methanol, the mixture heated, and 200 ml. of acetonitrile added. The addition of one liter of tetrahydrofuran gave a precipitate which was filtered after 2 hours in the cold and dried *in vacuo* over KOH pellets. Yield 21.0 g. (70%), $[\alpha]_D^{25} = -10.1°$ (c.=1, MeOH).

Calculated for $C_{13}H_{26}N_8O_5Br$: Br, 17.59. Found: Br, 23.73.

Amino acid analysis found: $Arg_{0.96}Pro_{1.00}Gly_{1.00}$.

$R_f$ 0.10 (n-butanol-acetic acid-water, 4:1:1).

EXAMPLE 10 t-Butyloxycarbonyl-L-leucyl-G-nitro-L-arginyl-L-prolyl-glycinamide (XI)

To a solution of 20.0 g. (0.0441 mole) of X in 150 ml. of N,N-dimethylformamide (DMF) at 0° C. were added 12.2 ml. (0.062 mole, calculated on the basis of the hydrogen bromide in X determined by elemental analysis) of N,N-dicyclohexylamine (DCHA). Another 50 ml. of DMF was added to facilitate stirring. After addition of 18.65 g. (0.053 mole) of t-butyloxycarbonyl-L-leucine p-nitrophenyl ester, the reaction mixture was stirred 72 hours. The reaction mixture was cooled to 0° C. and filtered to remove DCHA·HBr. The solution was evaporated *in vacuo* to a residue which was redissolved in ethyl acetate and reprecipitated with ether to give an amorphous solid; yield 17.94 g. (69%) after drying *in vacuo* at 40° C., $[\alpha]_D^{25} = -57.9°$ (c.=1, MeOH).

Amino acid analysis: $Leu_{0.99}Arg_{0.95}Pro_{1.00}Gly_{1.02}$.

EXAMPLE 11

L-leucyl-G-nitro-L-arginyl-L-prolyl-glycinamide hydrochloride (XII)

Dry hydrogen chloride was bubbled into a solution of 19.0 g. (0.032 mole) of XI in 50 ml. of acetic acid containing 5 ml. anisole, 5 ml. triethylsilane, and 5 ml. of trifluoroacetic acid. After 30 minutes, the reaction mixture was diluted with ether, and the resulting precipitate was triturated. The product was removed by filtration, dried *in vacuo* and redissolved in hot ethanol-acetonitrile (1:1). Addition of ether, cooling, and filtration gave an amorphous, hydroscopic precipitate. Yield 16.7 g. (99%).

Analysis.—Calcd. for $C_{19}H_{37}O_6Cl$: Cl, 5.96. Found: Cl, 7.64.

Amino acid analysis: $Leu_{0.97}Arg_{0.97}Pro_{1.04}Gly_{1.02}$.

$R_f$ 0.28 (n-butanol-acetic acid-water, 4:1:1), containing a very minor contaminant $R_f$ 0.52. $[\alpha]_D^{25} = -36.9°$ (c.=1, MeOH).

EXAMPLE 12

$N^\alpha,N^{IM}$-diadamantyloxycarbonyl - L - histidyl - L - tryptophyl-O-t-butyl - L - seryl - L - phenylalanyl-glycyl-L-leucyl-G-nitro-L-arginyl-L-prolyl-glycinamide (XIII)

To a solution of 0.523 g. (1 mmole, based upon the chlorine analysis) of XII in 10 ml. of N,N-dimethylformamide was added 0.123 ml. (1.1 mmoles) of N-methyl morpholine. The resulting solution was stirred at room temperature for 20 minutes. It was then treated with a mixture of 1.045 g. (1 mmole) of VI and 0.135 g. (1 mmole) of 1-hydroxybenzotriazole in 5 ml. of N,N-dimethylformamide. The reaction mixture was cooled in an ice-ethanol bath.

A cold solution of 0.227 g. (1.1 mmoles) of N,N'-dicyclohexylcarbodiimide in 4 ml. of N,N-dimethylformamide was added. The mixture was maintained at 5° C. for 113.5 hours. The resulting dicyclohexylurea was filtered off. Product was precipitated from the filtrate by addition of ether. The product was gummy. It was redissolved in N,N-dimethylformamide, and the solution was concentrated in vacuo to an oil. A small amount of N,N-dimethylformamide was added. Ethyl acetate was then added to precipitate the product. The product was collected and washed successively with ethyl acetate, 1N sodium bicarbonate solution and water. The solid product was dried in vacuo over potassium hydroxide; yield, 1.082 g. (72%), m.p. 170° C. (dec.), $[\alpha]_D^{25} = -20.1°$ ($c. = 1.32$, TFE).

Analysis.—Calcd. for $C_{76}H_{106}N_{17}O_{16}$: C, 60.30; H, 7.06; N, 15.73; O, 16.91. Found: C, 60.08; H, 7.33; N, 15.92; O, 17.09.

Amino acid analysis: $His_{0.94}Trp_{0.89}Ser_{0.83}Phe_{0.97}Gly_{1.01}Leu_{1.0}Arg_{0.93}Pro_{0.98}Gly_{1.01}$.

TLC:

| System | A | B |
|---|---|---|
| $R_f$ of XIII | 0.782 | 0.557 |
| Slight contaminant | | 0.188 |

System A: Tetrahydrofuran/cyclohexane/water/acetic acid (186:14:10:20).
System B: Tetrahydrofuran/cyclohexane/water (140:10:8).

EXAMPLE 13

Benzyloxycarbonyl - L - pyroglutamyl - L - histidyl - L - tryptophyl-O-t-butyl - L - seryl-L-phenylalanyl-glycyl-L-leucyl-G-nitro-L-arginyl-L-prolyl - glycinamide (XV)

To a solution of 0.908 g. (0.6 mmole) of XIII in 10 ml. of warm phenol were added 1 ml. of mercaptoethanol, 3 ml. of water, and 25 ml. of trifluoroacetic acid. The mixture was stirred at room temperature for 1¼ hours. The resulting solution was concentrated in vacuo to an oil. The oil was triturated with ether and chilled at −11° C. The deblocked nonapeptide (XIV) was collected and washed with ether. A thin layer plate run in tetrahydrofuran/cyclohexane/water (140:10:8) indicated one spot product with no starting material (XIII). $R_f$ of XIII was 0.549, and $R_f$ of the N-deblocked nonapeptide (XIV) was 0.0.

The deblocked peptide (XIV) was dissolved in 10 ml. of N,N-dimethylformamide, and 5 ml. of 2N potassium bicarbonate solution were added. The mixture was stirred at room temperature for 4 hours. Water was added to dissolve excess salt and to precipitate the neutralized intermediate. The intermediate was an oily solid which was then dissolved in 15 ml. of N,N-dimethylformamide. The solution was treated with a mixture of 0.308 g. (0.6 mmole) of the pentachlorophenyl ester of benzyloxycarbonyl-L-pyroglutamic acid and 0.0073 g. (0.06 mmole) of dimethylaminopyridine in 5 ml. of N,N-dimethylformamide. The reaction mixture was stirred at room temperature for 116 hours during which time solution was achieved. The solution was treated with 5 ml. of pyridine and 20 ml. of water and heated on a steam bath for 10 minutes. Water was added, and the product precipitated. It was collected and washed with water. The product was dried in vacuo over potassium hydroxide; yield, 0.110 g. (13%, reduced by accidental loss of product).

Amino acid analysis:
$PyroGlu_{1.43}His_{0.63}Trp_{0.51}Ser_{0.84}Phe_{1.0}Gly_{1.0}Leu_{1.0}Arg_{1.1}Pro_{0.95}Gly_{1.0}$

TLC:

| System | A | B |
|---|---|---|
| $R_f$ of XV | 0.0 | 0.144 |
| Slight contaminant | | 0.505 |

System A: Chloroform/methanol/acetic acid (135:15:1)
System B: Tetrahydrofuran/cyclohexane/water (140:10:8)

EXAMPLE 14

L-pyroglutamyl-L-histidyl-L-tryptophyl-L-seryl-L - phenylalanyl-glycyl-L-leucyl-L-arginyl - L - prolyl-glycinamide diacetate salt (XVI)

To 0.110 g. (0.078 mmole) of XV were added 0.5 ml. each of triethylsilane and ethyl methyl sulfide. The mixture was cooled in liquid nitrogen, and 10 ml. of liquid hydrogen fluoride were added by distillation. The mixture was allowed to warm to 0° C. over 1¼ hours. The hydrogen fluoride was removed by distillation, and the residue was triturated with ether. The resulting solid was collected and air dried. It then was dissolved in 1M acetic acid and lyophilized to dryness. This procedure was repeated twice.

The product then was dissolved in 15 ml. of cold 1M acetic acid. The resulting clear solution was absorbed on a Sephadex G–10 column. Chromatographic conditions were as follows: solvent, 1M acetic acid (at 4° C.); column size, 2.5 x 90 cm.; flow rate, 55.5 ml./hour; fraction volume, 18.5 ml.

A plot of absorbance at 280 mμ of each fraction versus fraction number indicated a major peak with 2 small shoulders. A collection of 3 sets of fractions was made. Fractions collected and their effluent volumes were: Fractions 10–12 (166–222 ml.), Fractions 13–14 (222–259 ml.), Fractions 15–20 (260–370 ml.). Each of the three samples were lyophilized and collected. Weights of the three samples were 41.5 mg., 14.5 mg., and 16.5 mg., respectively. Amino acid analyses indicated the first sample was the best sample of product XVI.

Amino acid analysis:
$PyroGlu_{0.78}His_{0.98}Trp_{0.31}Ser_{0.78}Phe_{0.97}Gly_{1.07}Leu_{1.0}Arg_{1.02}Pro_{1.02}Gly_{1.07}$ Assay of the LH-RH analog.—The lyophilized fraction obtained from G–10 Sephadex chromatography was made up in a stock solution, nominally 0.1 mg./ml. by weight.

Amino acid analysis showed 4.5±0.5 nanomoles of decapeptide analog per ml., contaminated with 7.5 nanomoles/ml. of the octapeptide (fragment 3 to 10).

At a nominal dose of 50 nanograms (ng.) ($5 \times 10^{-4}$ ml. = 2.25 picomoles of decapeptide analog), LH released at 30 minutes was 6.0±4.2 ng. per mg. of pituitary tissue. This release is equal to that obtained from 1.8 picomoles of natural (synthetic) LH-RH, or a relative potency of 80%.

I claim:
1. A compound of the formula

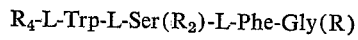
$R_4$-L-Trp-L-Ser($R_2$)-L-Phe-Gly(R)

in which R is hydrogen, methyl, ethyl, p-nitrobenzyl, or benzyl; $R_2$ is t-butyl or benzyl; and, when $R_2$ is t-butyl, $R_4$ is H-, CBz-, or (AdOC)$_2$-L-His-; and, when $R_2$ is benzyl,
$R_4$ is H-, CBz-, BOC-, AOC-, AdOC-, or (AdOC)$_2$-L-His-.

2. Compound of claim 1, in which R is hydrogen, ethyl or p-nitrobenzyl; $R_2$ is t-butyl; and $R_4$ is H- or CBz-.

3. Compound of claim 1, in which R is hydrogen, ethyl, or p-nitrobenzyl; $R_2$ is benzyl; and $R_4$ is H- or BOC-.

References Cited

Baba et al.: J. Biol. Chem., 246, 7581–7585 (1971).
Chang et al.: J. Med. Chem., 15, 623–7 (1972).
Matsuo et al.: Biochem. Biophys. Res. Comm., 43, 1334–9 (1971).
Baba et al.: Biochem. Biophys. Res. Comm., 44, 459–63 (1971).
Sievertsson et al.: Biochem. Biophys. Res. Comm., 44, 1566–71 (1971).
Geiger et al.: Biochem. Biophys. Res. Comm., 45, 767–73 (1971).
Matsuo et al.: Biochem. Biophys. Res. Comm., 45, 822–7 (1971).
Rivaille et al.: Helv. Chim. Acta, 54, 2772–5 (1971).

LEWIS GOTTS, Primary Examiner

R. J. SUYAT, Assistant Examiner

U.S. Cl. X.R.

424—177